Figures 1, 1A, 1B:
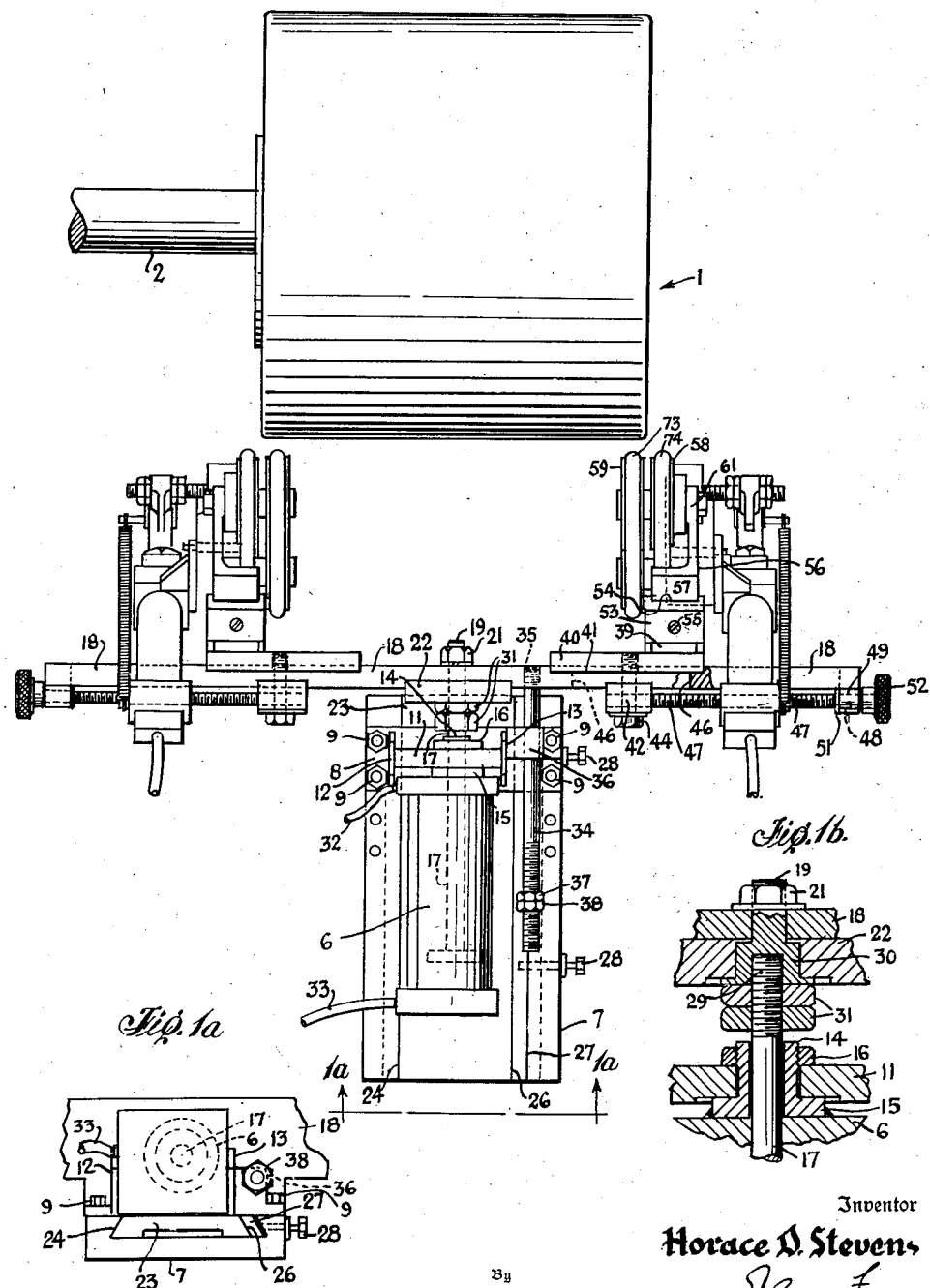

Jan. 8, 1952  H. D. STEVENS  2,581,933
STITCHER FOR TIRE-BUILDING APPARATUS
Filed April 27, 1950  4 Sheets-Sheet 1

Inventor
Horace D. Stevens
Ely & Frye
Attorneys

Jan. 8, 1952     H. D. STEVENS     2,581,933
STITCHER FOR TIRE-BUILDING APPARATUS
Filed April 27, 1950     4 Sheets—Sheet 2

Inventor
Horace D. Stevens
By Ely & Frye
Attorneys

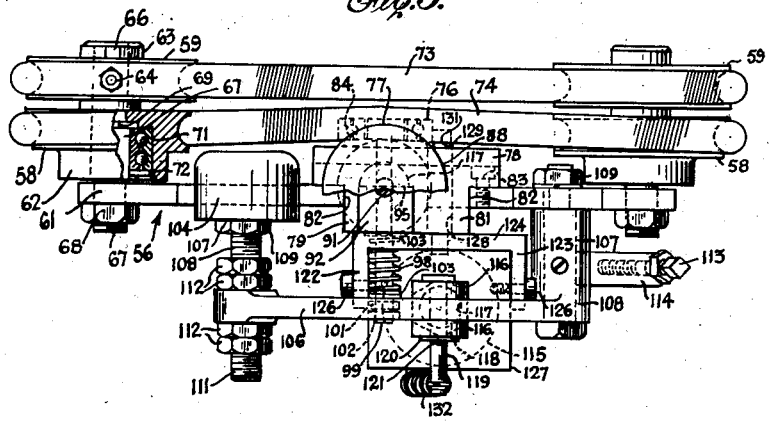

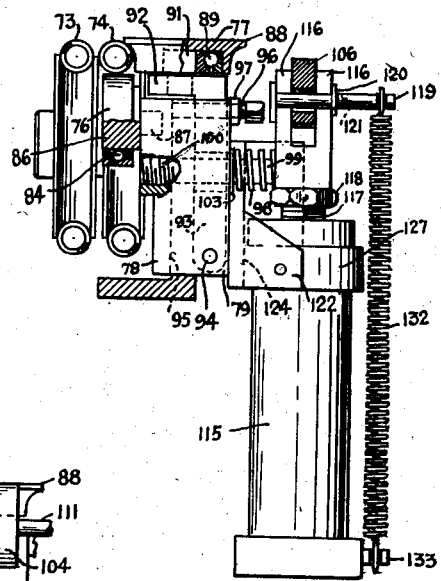

Patented Jan. 8, 1952

2,581,933

UNITED STATES PATENT OFFICE 2,581,933

STITCHER FOR TIRE-BUILDING APPARATUS

Horace D. Stevens, Sarasota, Fla., assignor to The Firestone Tire & Rubber Company, Akron, Ohio, a corporation of Ohio Application April 27, 1950, Serial No. 158,482

18 Claims. (Cl. 154—10)

This invention relates to a tire-building apparatus and, in particular, to a ply stitcher therefor. In the "flat band" process wherein tire components are assembled in sequence on a collapsible, cylindrical drum, the various layers are brought into intimate contact and adhesion with adjacent layers by what is known as stitching, and which consists in applying pressure by any convenient means, progressively, over the outer surface of the plies. This stitching process includes the turning of plies at the ends of the drum to encase the reinforcing beads. It is this latter phase which has received the most attention in the development of stitching tools. No completely satisfactory stitching tool, or combination thereof, has heretofore been provided for the ply-turning operations, and much of this phase of the work is still being performed manually by tire-builders, either with the bare hand or with a hand stitching tool, despite the presence of automatic stitchers on the machine.

Earliest of the ply-turning stitchers were the roller type, wherein rollers of various shapes, adapted to be rotated by contact with the work, were swung in a path generally radially of the drum to make contact with the work. An early form of such a stitcher tool comprised a simple, drum-shaped roller, which contacted the periphery of a drum at the edge thereof, and an associated roller, which was located so as to be movable across the edge of the drum to turn down the plies, and had a surface contour whereby to accomplish similar turn-down of plies in a later stage of the building process, with the bead in place. These types involved substantially a point contact between stitcher and plies, and wrinkling of the plies was of frequent occurrence. Furthermore, the adhesion of the layers was not satisfactory, and the adhesion, as well as the turn-down, would frequently be defeated by the action of centrifugal force so that only relatively low drum speeds were possible. Another drawback of this arrangement resided in its inflexibility. The stitchers had to be set at a definite location and any variation in the location of the plies being turned would result in malfunctioning and possible damage to the plies.

Spring stitchers of the endless, resilient belt type have been heretofore proposed, but have had only limited application. By the present invention, an efficient turn-down of plies in a radial direction across the end edge of the drum is made possible by an arrangement of belt-type spring stitchers, and a satisfactory adhesion of the initial ply to the drum without wrinkling or other distortion is possible, so that increased drum speeds may be employed.

It is, therefore, an object of the invention to provide for more efficient accomplishment of ply turn-down in tire building. More particularly, it is an object to provide for more efficient ply turn-down in a process involving turning of ply ends to a position substantially radial of the tire-building drum. Other objects are to increase the area of contact of the stitcher with the work, to provide a yieldable contact pressure on the turn-down stitcher, to avoid wrinkling in ply turn-down, to increase the degree of adhesion of ply to drum, and ply to ply, and thus enable higher drum speed, and to avoid damage to the plies and loss of adhesive.

Figure 2:
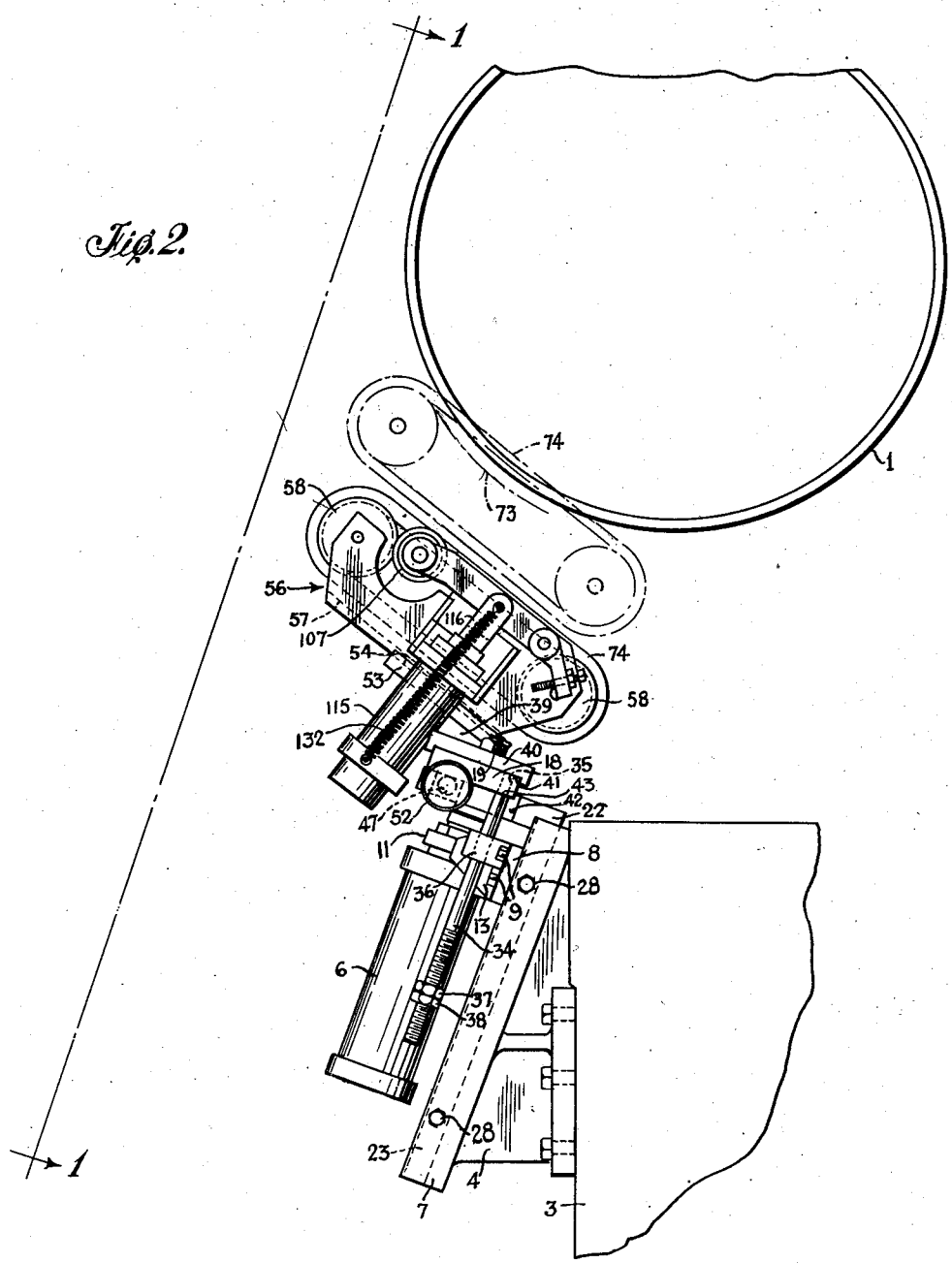

These and other ends, which will in part be apparent and in part made manifest as the description proceeds, are attained by the present invention, a preferred form of which is described in the accompanying specification and illustrated in the drawings in which:

Fig. 1 is an oblique, front elevation of the spring stitcher assembly and drum, as viewed along the line 1—1 of Fig. 2, Fig. 1a is a view taken on the line 1a—1a of Fig. 1, Fig. 1b is an enlarged sectional view of a detail in Fig. 1 at the upper end of the piston rod of the lower air cylinder, Fig. 2 is an end view of the assembly of Fig. 1, viewed from the right of that figure and showing, in broken lines, an adjusted position of a stitcher, Fig. 3 is a top plan view of the spring stitcher unit assembly, Fig. 4 is a front elevation of the assembly of Fig. 3, Fig. 5 is a sectional view taken on the line 5—5 of Fig. 4, Fig. 6 is a fragmentary view of an edge of the drum showing the turn-down of the first pair of plies by the stitcher, Fig. 7 is a view similar to Fig. 6 showing, in broken lines, the turn-down of the second pair of plies, after the bead has been applied, and Fig. 8 is a fragmentary view of an edge of the drum showing the completed turn-down of the second pair of plies.

Referring to the drawings by characters of reference, there is shown generally at 1 a tire-building drum attached to a shaft 2, revolvable by conventional power means, not shown.

As seen in Fig. 2, the spring-stitcher assembly is supported on a base 3 by means of a bracket 4, the entire stitcher mechanism being movable to and from the drum 1 by means of an air cylinder 6, of conventional design, fixed to a table 7 on bracket 4, the table being slanted somewhat to the vertical. The support for the cylinder comprises a cross-piece 8 fixed to the table 7 by four screws 9. An upright plate 11, secured to support 8, and strengthened by a pair of end braces 12, 13 is bored to receive a threaded sleeve 14 (Fig. 1b) having a head 15 fixed to the cylinder, and the cylinder is secured to plate 11 by means of a nut 16 on sleeve 14.

The piston rod 17 is slidable through sleeve 14 and connects with the platform carrying the stitcher mechanism, in a manner presently to be described, to move the same to and from the drum.

The stitcher-supporting platform comprises a cross-plate 18, secured by a bolt 19 and a nut 21 to an upright element 22 which is integral with a carriage 23 with beveled sides 24, 26 which complementarily engage undercut ways in table 7, so as to be slidable therein. A gib 27 of rhomboidal cross section is provided, together with screws 28, so that the tightness of the sliding fit may be adjusted. The piston rod 17 is threaded at its outer end and is engaged in a threaded bore 29 in a head 30 on the bolt 19, and is secured in such engagement by locking nuts 31. Air lines 32, 33 provide for double action of the piston rod. It will be seen that as piston rod 17 moves, it carries with it the support plate 18, together with the stitchers, and slide plate 23, engaging the ways of table 7, keeps the system in constant alignment respecting the axis of piston rod 17.

For limiting the outward extent of motion of the stitcher mechanism, a rod 34 is threadedly attached to support plate 18, as at 35, and is slidable in a bore in a stop block 36 carried by the cross-piece cylinder support 8. A nut 37 threaded on rod 34 stops the outward motion when it abuts block 36, and nut 37 is locked in position by a second nut 38.

The stitcher units are mounted for adjustable positioning along the support cross bar 18. Since these units, which are intended for operating on opposite rims of the drum, are identical except for the left and right hand arrangement of their respective parts, only one need be described, the stitcher unit to the right in Fig. 1 being selected for this purpose.

The stitcher unit is supported on plate 18 by means of a bracket 39, the base 40 of which is recessed as at 41 for guided, sliding adjustment along plate 18, and a clamping bar 42, recessed as at 43, is secured on the opposite side of plate 18 by means of a screw 44 passing through an elongate slot 46 in plate 18, and threadedly engaging base 40 of bracket 39. When screw 44 is loosened, base 40 may be adjusted along bar 18 with slot 46 providing clearance for the screw. Fine adjustment of the position of the bracket 39 on plate 18 is provided by means of a screw 47 having a neck 48 rotatable in a bearing block 49 secured on the underside of plate 18, at the end thereof, and threadedly engaging the clamping bar 42. The neck 48 is retained in the bearing block 49 by means of a collar 51 and rotation of the knurled head 52 urges the clamping bar 42 along the plate 18.

Bracket 39 has an upper plate or table 53, inclined to the base 40, and with its top surface centrally recessed along its length, as at 54, to accommodate a main bracket 56 which directly supports the stitchers. Bracket 56 is of L section, with its base 57 fitted in recess 54 and bolted as at 55 to table 53.

A pair of axially aligned sheaves 58, 59 (Fig. 3) is mounted at each end of the upright wall 61 of bracket 56, the respective pairs being identical in form, mounting, and arrangement. As seen from the cutaway view to the left of Fig. 3, sheave 58 has a hub 62 adjacent wall 61, and a hub 63 on its other side, to which sheave 59 is keyed for rotation by means of set screw 64 engaging a flat surface 66 on the hub. Each pair of sheaves is mounted on bracket wall 61 by means of a stud 67 and nut 68. The head 69 of stud 67 is anchored behind a conventional bearing face 71, the latter being secured by a spring ring lock 72 received in an annular groove on the inner surface of hollow hub 62. Hub 63 is centrally bored so that the slotted head 69 may be reached with a screw driver in the tightening of nut 68. A helically coiled, endless belt 73 is trained over sheaves 59, and a similar belt 74 is trained over sheaves 58.

Belt 73 is intended for engagement with the plies on the drum periphery at the edge thereof and, in use, its upper portion is depressed by the drum into arcuate form as belt 74 moves across the edge of the drum. (See dotted line positions in Fig. 2.) Belt 74 is supported against inward deflection medially of its span and also hindered as to motion axially of the drum by means of backing rollers or sheaves 76 and 77, respectively (Fig. 5.) Mounting for rollers 76, 77 is provided in a block 78, rectangular in outline, as seen in dotted lines in Fig. 4, and having a pair of vertically extending ribs on one face, comprising a narrow rib 79, and a wider rib 81. The outer, side faces of ribs 79, 81 are snugly received in a slot 82 in bracket wall 61, and the block 78 is secured to wall 61 by four screws 83.

Roller 76, having anti-friction bearings 84 (Fig. 5), is carried on a stud 86 with a shank 87 secured in the inner face of block 78. Roller 77 has an upper flange 88 and also has an anti-friction bearing 89 and is mounted, through a stud 91, on the upper, lateral arm 92 of an upright arm 93, which is pivoted on a pin 94 carried by ribs 79, 81, whereby arm 93 is swingable in the space between the said ribs. The swing of arm 93 counter-clockwise in Fig. 5 is limited by an adjusting screw 96 threaded through arm 93 and adapted to contact the rear wall 95 of the recess between ribs 79, 81, a locking nut 97 being provided on screw 96. Arm 93 is movable clockwise against the pressure of a coil spring 98, surrounding a guide rod 99 which is studded in block 78 as at 100. Spring 98 is secured by a nut 101 (Fig. 3) and lock nut 102 on guide rod 99, and preferably has a washer 103 at each end.

It will be noted (Figs. 3 and 5) that roller 77 is so positioned that, normally, belt 74 is, medially of the two sheaves 58, urged inwardly of the central plane of the said sheaves, this deflection being constantly modifiable during the stitching operation due to the pivoted arm mounting of the roller and the resilience of spring 98.

Belts 73 and 74 are intended only for turndown of the first pair of plies. For successive plies, higher drum speeds are desirable but it has been found that the endless spring stitchers do not stand up under high speeds, almost invariably failing under such conditions. Therefore, for turn-down of plies subsequent to the initial two plies, a roller stitcher 104 is provided. With the addition of the first two plies and the bead, the effective drum width is increased and, therefore, roller 104 is located outwardly of stitcher belt 74. Roller 104 is adapted for motion to and from the drum by means of its mounting on a swinging arm 106 having a hub 107 journaled on a bolt 108 secured near the rightward end (Fig. 4) of upright 61 of bracket 56 by means of a nut 109. Roller 104, which may have appropriate anti-friction bearings, is supported on a spindle 111 axially adjustable in a bore in the outer end of arm 106 and secured in position by nuts 112. Upward swing of arm 106 is limited by an adjustable screw 113 threadedly carried in an extension 114 of arm 106 and adapted to abut the mounting of the air cylinder now to be described.

Upward swing of arm 106 is effected by the piston rod of an air cylinder 115 of conventional structure. A clevis 116, threaded on the piston rod 117 and secured by a locking nut 118 is pivotally secured to arm 106 by means of a headed pin 119 having a washer 120 secured by a locking pin 121.

Air cylinder 115 is mounted between the extending arms 122, 123 of a saddle bracket 124, being secured by screws 126 threaded into the upper, rectangular mounting sleeve 127 of the air cylinder. Bracket 124 is swivelled (Fig. 3) in a bore in rib 81 of block 78 by means of a pin 128 so that cylinder 115 may automatically adjust its inclination suitable to the angular position of the driven arm 106. Pin 128 is fixed to bracket 124 as by welding and is rotatable in block 78, being retained therein by means of a split washer 129 engaging in an annular groove 131 in the pin on the inner side of block 78.

Air cylinder 115 is single acting for upward swing of arm 106, and return of the arm is accomplished by a tension coil spring 132 engaging an annular groove in pivot pin 119 and an annular groove in a pin 133 carried on the lower mounting collar 134 of the air cylinder. It will be noted that the cylinder 115 and its bracket mounting are supported solely on pin 128.

The operation of the stitchers (Figs. 6-8) will now be described with reference to the building of a four-ply tire, considering only the stitcher elements at one end of the drum. The first and second plies 136, 137 are wrapped around the drum in succession. The drum is of simple tubular form when in working condition, with an edge 135 perpendicular to its axis. The plies are somewhat wider than the length of the drum so that the portions intended to be wrapped around the beads extend beyond the ends of the drum. In preparation for encasing the bead, the ply ends extending beyond the ends of the drum are turned down; that is to say, wrapped around the edge of the drum so as to assume a position generally radially of the drum. Necessarily, in this operation, radially extending folds, or pleats, will appear in the turned-down portions of the plies. It is largely on account of these radial pleats that stitchers of small contact area are not suited for the turn-down operation, and tire builders have often resorted to using their hands to effect the turn-down in preference to the use of mechanical stitchers.

The turn-down of the first two plies by the spring stitcher of the present invention is shown in Fig. 6. At this stage, the spring stitcher unit has been brought up into engagement with the outer ply by action of air cylinder 6. After stitcher belt 73 contacts the outer ply, the travel of its central portion is arrested at the point of contact with the plies on the drum, and as the stitcher mounting continues its generally upward motion of upper span of belt 73 assumes an arcuate form and engages the outer ply over an appreciable arc, with sufficient pressing action on the plies to cause them to adhere together, and to cause the inner ply to adhere to the drum. Belt 73 is driven by the drum and this drive is communicated to belt 74 by the fixed connection between sheaves 59 and 58. The most important contribution of stitcher belt 73 is the minimizing or elimination of wrinkling of the plies. As to its structure, manner of application and purpose, stitcher belt 73, itself, is conventional and represents the state of the art as to stitchers of this type prior to the present invention.

The continued progress of the stitcher mounting after contact of belt 73 with the plies carries the belt 74 past the edge of the drum (see the broken line position in Fig. 2) with the result that the ply edges are turned inwardly. Since belt 74 is supported from beneath by roller 76, its central region is fixed against downward deflection and a positive turn-down of the plies results. Although belt 74 is thus held against flexure, it nevertheless presents an effective stitching area over a substantial expanse of the plies since it operates across the end of the drum. The deflection of the middle of the top span of belt 74 axially toward the drum, due to the action of spring 98 and determined in amount by the setting of screw 96, provides a progressive action to the turning of the plies. The portion of the belt near the outer one of the two sheaves 58 is the point of initial contact and, since it is slightly further from the drum end than is the center of the belt, the turning of the plies is accomplished in gradual fashion during the interval that a given point on the plies passes from the point of initial contact to the region of roller 77. Thus, by virtue of the increased area of contact and the progressive folding of the plies, the problem of turn-down accompanied by radial folds is effectively solved. Furthermore, the turn-down operation is rendered smooth by the resilient backing of the arm carrying roller 77, since any tendency of the folding operation to depart from a regular pattern is not solidly resisted, but results in a yielding of the turn-down stitcher, and the normal functioning is quickly restored.

The offset of the center of belt 74 and the resilient mounting of its guide pulley entail a further advantage in that the mid point of the belt can first contact the outside of the drum at the edge and then, receding against the pressure of spring 98, passing around the corner and across the edge, after clearing which, it is moved slightly inwardly of the drum by the restoring force of spring 98. In this way, a very close stitching of the plies to the drum is achieved, starting near the region stitched by spring 73 and extending entirely across and beyond the drum edge. As a result, the plies are sealed to the edge of the drum, and are not likely to be disarranged by the effects of centrifugal force.

In the succeeding step, the spring stitcher unit as a whole is caused to recede from the drum by action of air cylinder 6 and the prepared bead 138 is secured to the plies in any convenient manner, as known in the art. With the bead in place, the turn-up of plies 136, 137 around the bead is effected by any appropriate means, Since the means for performing this operation forms no part of the present invention, no detailed description of it is necessary.

The third and fourth plies, 144, 145 are then wrapped in succession exteriorly of the second ply 137. The turn-down of these plies is effected by the roller stitcher 104 carried on the spring stitcher mounting. The inner face of roller 104 is located outwardly of belt 74, since the turn-down of plies 144, 145 takes place around the bead 138. At this stage of operations, a high speed of drum rotation is employed and it has been found that spring belt stitchers such as 73 and 74 break down at high speeds. However, the problem of pleating on ply turn-down is not very serious at this stage, since it takes place over the rounded contour of the bead, and a roller type stitcher is found to be adequate.

For initiation of the final turn-down, air cylinder 115 is actuated, and arm 106 carries roller stitcher 104 upward to fold the ends of plies 144, 145 along the side of the bead, (Fig. 7) after which the stitcher is returned by action of spring 132.

The final turn-down is completed by folding the plies along the bottom of the bead, with the result shown in Fig. 8. This operation will also be performed by mechanism with which the present invention is not concerned.

The mounting and stitching of the tire tread are conventional and need not be described here.

It will be seen that there has thus been provided a stitcher which simultaneously presses the plies into firm adhesion with each other and with the periphery of the drum, and continues on to effect the folding of the plies over the square edge of the drum, with uniform distribution of the resultant pleats. Furthermore, each contact is distributed over a considerable area of the plies, so that there are no sharp concentrations of stresses to harm the plies and the folding operation is rendered more certain and uniform. Also, the arrangement is such that in the turn-down of the plies to a position radially of the drum, the long line of contact of the stitcher serves the additional purpose of accomplishing the fold in a gradual manner. The resilient mounting of the turn-down stitcher not only enables the stitcher to "feel its way," somewhat in the manner of the hand of an operator when the plies are hand turned, but also permits of variation in the position of the work. As is well known to tire builders, the drum ends seldom rotate in a plane but rather wobble, especially if the machine has been used for any length of time. Both the spring mounting and the inherent resilience of the spring belt stitcher tend to compensate for any such misalignment.

While a certain preferred embodiment of the invention has been shown and described, the invention is not limited thereto, since changes in the size, shape, and arrangement, for instance, of the various parts, may be resorted to without, however, departing from the spirit or scope of the appended claims.

For instance, whereas the sheave 77 is shown as mounted on a rocker arm, it could as well be mounted for movement of direct translation. Also, roller stitcher 104 may partake of other forms and mountings and, in fact, it would be possible to achieve the final turn-down by a continuation of movement of a conventional tread stitcher if the treads were provided in exact widths so that interruption, due to necessity for edge trim thereof would be obviated.

What is claimed is:

1. For use with a tire building apparatus, a stitcher unit comprising a pair of sheaves, an endless, resilient belt carried on said sheaves, and a sheave intermediate said pair of sheaves, engaging said belt and mounted for motion transversely of said belt.

2. For use with a tire-building apparatus, a stitcher unit comprising a pair of sheaves, an endless, resilient belt carried on said sheaves, a third sheave intermediate said pair of sheaves, engaging said belt and mounted for motion transversely of said belt, and spring means urging said third sheave toward said belt.

3. For use with a tire-building apparatus, a stitcher unit comprising a pair of sheaves, an endless, resilient belt carried on said sheaves, a third sheave intermediate said pair of sheaves, engaging said belt and mounted on a rocker arm for motion transversely of said belt, and spring means urging said third sheave toward said belt.

4. For use with a tire-building apparatus, a stitcher unit comprising a first pair of sheaves, an endless, resilient belt carried on said first pair of sheaves, a second pair of sheaves mounted for rotation in a plane parallel to the plane of rotation of said first pair of sheaves, a second endless, resilient belt carried on said second pair of sheaves, and a fifth sheave intermediate said second pair of sheaves, engaging said second belt and mounted for motion transversely of said belt.

5. For use with a tire-building apparatus, a stitcher unit comprising a first pair of sheaves, an endless, resilient belt carried on said first pair of sheaves, a second pair of sheaves mounted for rotation in a plane parallel to the plane of rotation of said first pair of sheaves, a second, endless resilient belt carried on said second pair of sheaves, a fifth sheave intermediate said second pair of sheaves, engaging said second belt and mounted for motion transversely of said second belt, and spring means urging said fifth sheave toward said second belt.

6. For use with a tire-building apparatus, a stitcher unit comprising a first pair of sheaves, an endless, resilient belt carried on said first pair of sheaves, a second pair of sheaves mounted for rotation in plane parallel to the plane of rotation of said first pair of sheaves, a second, endless, resilient belt carried on said second pair of sheaves, a fifth sheave intermediate said second pair of sheaves, engaging said second belt, and mounted on a rocker arm for motion transversely of said belt, and spring means urging said fifth sheave toward said second belt.

7. For use with a tire-building apparatus, a stitcher unit comprising a first pair of sheaves, an endless, resilient belt carried on said first pair of sheaves, a second pair of sheaves coaxially mounted, respectively, with said first pair of sheaves and secured thereto for rotation therewith, a second, endless, resilient belt carried on said second pair of sheaves, and means contacting said second belt intermediate its carrying sheaves and urging said second belt away from the plane of rotation of said second pair of sheaves.

8. For use with a tire-building apparatus, a stitcher unit comprising a first pair of sheaves, an endless, resilient belt carried on said first pair of sheaves, a second pair of sheaves coaxially mounted, respectively, with said first pair of sheaves and secured thereto for rotation therewith, a second, endless, resilient belt carried on said second pair of sheaves, a fifth sheave intermediate said second pair of sheaves, engaging said second belt and mounted for motion transversely of said second belt, and spring means urging said fifth sheave toward said second belt.

9. For use with a tire-building apparatus, a stitcher unit comprising a pair of sheaves, an endless, resilient belt carried on said sheaves, a support for the inner side of said belt, intermediate said sheaves, means urging said belt laterally away from the plane of rotation of said sheaves, and a spring backing for said last-mentioned means.

10. For use with a tire-building apparatus, a stitcher unit comprising a pair of sheaves, an endless, resilient belt carried on said sheaves, roller means located on the inner side of said belt, intermediate said pair of sheaves, to prevent inward deflection of said belt, roller means urging said belt laterally away from the plane of rotation of said sheaves, said last-mentioned roller means mounted on a rocker arm, and spring means urging said last-mentioned roller means toward said belt.

11. For use with a tire-building apparatus, a stitcher unit comprising a first pair of sheaves, an endless, resilient belt carried on said first pair of sheaves, a second pair of sheaves for rotation in a plane parallel to the plane of rotation of said first pair of sheaves, a second, endless, resilient belt carried on said second pair of sheaves, a roller support located on the inner side of said second belt to prevent inward deflection of said belt, roller means engaging said second belt and mounted for motion transversely of the planes of rotation of said sheaves, and spring means urging said roller means toward said second belt.

12. For use with a tire-building apparatus, a stitcher unit comprising a first pair of sheaves, an endless, resilient belt carried on said first pair of sheaves, a second pair of sheaves coaxially mounted, respectively, with said first pair of sheaves, and secured thereto for rotation therewith, a second, endless, resilient belt carried on said second pair of sheaves, rotatable support means contacting the inner side of said second belt, roller means contacting said second belt intermediate its carrying sheaves and mounted for motion transversely of the planes of rotation of said sheaves, and spring means urging said roller means toward said second belt.

13. For use with a tire-building apparatus, a stitcher unit comprising a pair of sheaves, an endless, resilient belt carried on said sheaves, a spring-urged roller mounted for motion transversely of the plane of rotation of said sheaves, and contacting said belt intermediate said pair of sheaves, and an auxiliary roller stitcher mounted for motion generally parallel to the plane of rotation of said sheaves and generally transversely of the portion of said belt between said pair of sheaves.

14. For use with a tire-building apparatus, a stitcher unit comprising a pair of sheaves, an endless, resilient belt carried on said sheaves, rotatable support means engaging the inner side of said belt between said pair of sheaves, a spring-urged sheave mounted for motion transversely of the plane of rotation of said sheaves, and contacting said belt intermediate said pair of sheaves, and an auxiliary roller stitcher mounted for motion generally parallel to the plane of rotation of said sheaves and generally transversely of the portion of said belt between said pair of sheaves.

15. For use with a tire-building apparatus, a stitcher unit comprising a first pair of sheaves, an endless, resilient belt carried on said pair of sheaves, a second pair of sheaves with their plane of rotation generally parallel to that of the said first pair of sheaves, a second endless, resilient belt carried on said second pair of sheaves, rotatable support means engaging the inner side of said second belt between said second pair of sheaves, a spring-urged roller mounted for motion transversely of the planes of rotation of said sheaves, and contacting the said second belt intermediate said second pair of sheaves, and an auxiliary roller stitcher mounted for motion generally parallel to the planes of rotation of said sheaves, and generally transversely of the portion of said belt between said second pair of sheaves.

16. For use with a tire-building apparatus, a stitcher unit comprising a first pair of coaxial sheaves interconnected to rotate as a unit, a second pair of similarly arranged sheaves having common planes of rotation, respectively, with the said first pair of sheaves, and mounted for rotation on an axis spaced from the axis of said first pair of sheaves, a first, endless, resilient belt carried on respective, co-planar sheaves of said pairs, a second, endless, resilient belt carried on the other co-planar sheaves of said pairs, rotatable support means engaging the inner side of said second belt intermediate its carrying sheaves, a spring-urged roller mounted for motion parallel to the axes of said sheaves, and contacting the said second belt intermediate its carrying sheaves and adjacent the said support means, and an auxiliary roller stitcher mounted for motion generally parallel to the planes of rotation of said sheaves, and generally transversely of the portions of said belts between their carrying sheaves.

17. In combination, a tire-building drum, a stitcher unit comprising a mounting, power means to move the mounting as a whole to and from the said drum, a first pair of sheaves rotatable on a fixed axis on said mounting, a first helical-spring belt carried on said sheaves, a second pair of sheaves mounted coaxially with said first pair of sheaves and connected thereto for rotation therewith, a second, helical-spring belt carried on said second pair of sheaves, a first roller rotating on a fixed axis in said mounting parallel to the rotation axes of said sheaves and contacting the inner side of said second belt intermediate its carrying sheaves to prevent inward deflection of said second belt, a second roller arranged for rotation on an axis transverse to the rotation axes of said sheaves, and contacting the said second belt adjacent said first roller, said second roller mounted for motion as a whole to and from said second belt, and spring means urging said second roller toward said second belt.

18. In combination, a tire-building drum, a stitcher unit comprising a mounting, power means to move the mounting as a whole to and from the said drum, a first pair of sheaves rotatable on a fixed axis on said mounting, a first helical-spring belt carried on said sheaves, a second pair of sheaves mounted coaxially with said first pair of sheaves and connected thereto for rotation therewith, a second, helical-spring belt carried on said second pair of sheaves, a first roller rotating on a fixed axis in said mounting parallel to the rotation axes of said sheaves and contacting the inner side of said second belt intermediate its carrying sheaves to prevent inward deflection of said second belt, a second roller arranged for rotation on an axis transverse to the rotation axes of said sheaves, and contacting the said second belt adjacent said first roller, said second roller mounted for motion as a whole to and from said second belt, spring means urging said second roller toward said second belt, a roller stitcher mounted for motion transversely of the portions of said belts between their carrying sheaves, and means to move the said roller stitcher independently of the said means to move the said mounting.

HORACE D. STEVENS.

REFERENCES CITED

The following references are of record in the file of this patent:

UNITED STATES PATENTS

| Number | Name | Date |
| --- | --- | --- |
| 1,981,828 | Shook | Nov. 20, 1934 |
| 2,083,886 | White | June 15, 1937 |
| 2,088,889 | Wikle | Aug. 3, 1937 |
| 2,381,379 | Stevens | Aug. 7, 1945 |
| 2,544,390 | Mallory | Mar. 6, 1951 |

FOREIGN PATENTS

| Number | Country | Date |
| --- | --- | --- |
| 450,111 | Great Britain | July 10, 1936 |